UNITED STATES PATENT OFFICE 2,396,957

TREATMENT OF POLYMERIC MATERIALS WITH DITHIOGLYCIDOL

Wilbur Arthur Lazier and Frank Kerr Signaigo, Wilmington, Del., assignors to E. I. du Pont de Nemours & Company, Wilmington, Del., a corporation of Delaware No Drawing. Application January 27, 1944, Serial No. 519,906

16 Claims. (Cl. 260—212)

This invention relates to the treatment of polymeric materials, preferably organic, and to the preparation of new sulfur containing polymeric materials.

Polymeric materials, i. e., synthetic or natural materials whose chemical structure consists of a multiplicity of recurring units, do not in general lend themselves readily to chemical reaction. In particular, it is often difficult to modify them by introducing elements such as nitrogen or sulfur, which are frequently desirable to modify or improve such properties as affinity for dyestuffs, resistance to water and organic solvents, etc.

An object of this invention is to provide a simple process for introducing sulfur into polymeric materials. Another object is to provide a process for modifying the physical and chemical properties of polymeric materials. A further object is to provide polymeric materials containing sulfur in a form resistant to removal by physical or chemical means. Other objects will appear hereinafter.

In accordance with this invention, these objects are accomplished by bringing a polymeric material into contact with monomeric dithioglycidol until at least part of the dithioglycidol sulfur has become bound to the polymeric material and removing any uncombined dithioglycidol.

Monomeric dithioglycidol is a recently synthesized new chemical. It is described and claimed in application Serial No. 498,879, filed by F. K. Signaigo on August 16, 1943. It is prepared as follows: 1,2-dithioglycerol [Berichte 75 13 (1942)] is heated at 10 mm. pressure under reflux beginning at about 110° C. The temperature drops after a few minutes to 50–60° C., whereat the low-boiling product is withdrawn at such a rate that the temperature does not rise above 60° C. Refractionation of the distillate yields pure dithioglycidol. This product has the formula

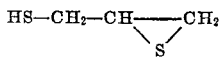

It is a colorless liquid boiling at 77° C. at 30 mm. pressure, and characterized by great chemical activity.

The structure of the products obtained by combining polymeric materials with monomeric dithioglycidol has not been established with certainty. In some cases, particularly when the polymeric material contains hydroxyl groups, it is reasonably certain that a true chemical reaction takes place. In other cases, especially when the polymeric material has a fibrous structure, it is possible that the dithioglycidol merely polymerizes within the polymeric structure. There is also the possibility that the dithioglycidol may in part react chemically, for example, with the end groups of certain polymeric materials, and in part be physically absorbed and/or intimately polymerized within the polymer. Oxidation of thiol groups also may play a part. Regardless of the mechanism, however, the criterion of the combination is that the sulfur bound to the polymeric materials is not removable by ordinary physical or chemical means such as extraction with solvents or reagents which readily dissolve, or react with, the monomeric dithioglycidol.

The invention is illustrated by the following examples, in which parts are by weight.

Example I

Twenty-four parts of alkali cellulose containing 12.6% of alkali, calculated as sodium hydroxide, and previously washed with anhydrous ethanol to remove any free alkali, is suspended in an ether solution of 8.2 parts of dithioglycidol. After several days' contact at room temperature the solvent is filtered off and the reaction product is washed thoroughly with ether to remove any unreacted dithioglycidol and then dried in air. The modified alkali cellulose so obtained is found by analysis to contain 13% by weight of sulfur, of which a very small portion is present as mercapto sulfur. The modified alkali cellulose may be xanthated and regenerated by known means to give regenerated cellulose fibers or films containing sulfur and having increased affinity for dyestuffs. The sulfur present is not removable by extraction with the common organic solvents, in which monomeric dithioglycidol is very readily soluble.

Example II

Skeins of high tenacity viscose rayon yarn are activated by soaking in water for several hours at room temperature and washing successively with ethanol and benzene, and finally dried by centrifuging. Two of these skeins are suspended in a benzene solution containing 30% by weight of dithioglycidol for several hours at room temperature, then centrifuged until dry. One of these skeins is then heated at a temperature of 100–110° C. for 5 hours, and the other one is suspended in an atmosphere containing ammonia vapors at room temperature for 18 hours. Both skeins are then thoroughly washed with warm water containing a detergent, rinsed with pure water and dried. The treated skeins are found by analysis to contain 4.0 and 3.7% of sulfur, respectively.

In comparison, the same high tenacity regenerated cellulose yarn which has not been treated with dithioglycidol is found to contain only a trace of sulfur, apparently due to the presence of a trace of undecomposed cellulose xanthate. Both of the treated skeins are more water repellent and exhibit better adhesion to rubber than a control similarly activated but not treated with dithioglycidol. The treated regenerated cellulose fibers show no deterioration whatsoever in their physical properties.

*Example III*

Forty parts of N-methoxymethylpolyhexamethyleneadipamide, in which approximately 40% of the amido hydrogens are replaced by methoxymethyl groups, is dispersed in 80 parts of methanol at 60° C. To the dispersion is added 26 parts of dithioglycidol, then five parts of alcoholic hydrogen chloride. The dispersion sets to a tough, rubbery, opaque gel in a few minutes. The resulting modified polymer, upon being separated from the solvent, is found to contain sulfur and to be no longer soluble in solvents in which it was readily soluble before treatment with dithioglycidol. It is also infusible below its charring point, whereas the untreated polymer melts at about 130° C.

The process can be applied likewise to yarns and fabrics made of N-methoxymethylpolyhexamethyleneadipamide. It can also be applied to a fabric coated with N-methoxymethylpolyhexamethyleneadipamide, for example by spraying the coating with an alcohol solution of dithioglycidol containing an acid catalyst whereby the coating is insolubilized directly on the fabric and made heat resistant.

In the same manner, N-hydroxymethylpolyhexamethyleneadipamide, as such or in the form of yarn, fabric or film, is modified and insolubilized by treatment with monomeric dithioglycidol.

*Example IV*

Two skeins of undrawn polyhexamethyleneadipamide are soaked in a solution of 95% ethanol containing 2% of p-cresol and 10% dithioglycidol for three days at room temperature, then dried. One skein is heated at 100–110° C. for five hours, and the other is suspended in an atmosphere of gaseous ammonia at room temperature for eight hours. The skeins are then washed thoroughly with a detergent solution, rinsed and dried. The treated yarns are found by analysis to contain 0.39% and 1.70% of sulfur, respectively. The sulfur bound to the polyamide fibers is not removable by extraction with solvents in which dithioglycidol is readily soluble. The appearance or physical properties of the fibers are in no way impaired and the fibers show increased affinity for dyestuffs.

Instead of polyamide fibers, casein fibers may be treated in a similar manner, with the result that their sensitivity to water is decreased.

*Example V*

An interpolymer of butadiene and styrene containing about 25% by weight of styrene is masticated on a rubber mill at 70° C. with 2% of its weight of dithioglycidol. It is found that the synthetic rubber undergoes, during this operation, a curing action which makes it more resilient and less sensitive to the action of organic solvents. The sulfur thus introduced into the polymer is not removable by extraction with the common organic solvents. Likewise, the butadiene/styrene interpolymer may be milled with dithioglycidol in addition to the usual fillers and accelerators and the resulting products may be heat-cured with improvement in resilience and resistance to organic solvents.

The process of this invention is applicable to any polymeric material. Additional examples are inorganic polymers such as asbestos, polysilicic acids, polyphosphonitriles, etc.; natural organic polymers such as wool, silk, cellulose, starch, cotton, rubber, gelatin, albumin, leather, paper, etc.; synthetic organic polymers such as cellulose esters and ethers, e. g., cellulose acetate, methylcellulose, ethylcellulose, benzylcellulose; polyvinyl alcohol, acetalized polyvinyl alcohol, polyvinyl acetate; alkyd resins; polyacrylic or methacrylic acids, esters, amides, nitriles; polyamides and interpolyamides, polyesters, polysulfides; polymerized butadiene, polymerized styrene, polychloroprene, etc. In general, hydroxylated polymeric materials such as cellulose and its derivatives give the best results in the operation of this process. In view of the great reactivity of dithioglycidol, the process can often be carried out at room temperature, or even lower, e. g., at any temperature above 0° C. If desired, the reaction may be accelerated by using elevated temperature and atmospheric or superatmospheric pressures. The reaction is in general extremely rapid at temperatures of about 100 to about 150° C., although higher temperatures may be used. Another way of accelerating the reaction is to use basic or acidic catalysts, which probably act by virtue of their capacity to open the sulfide ring of dithioglycidol. Examples of such catalysts are the alkali hydroxides such as sodium or potassium hydroxide, the alkaline earth hydroxides such as calcium or barium hydroxides, magnesium hydroxide, ammonia or strongly basic amines. Acidic catalysts include hydrochloric acid, either aqueous or gaseous, sulfuric acid, phosphoric acid, acetic acid, lactic acid, para-toluenesulfonic acid, etc.

The amount of sulfur introduced into the polymeric material may be varied within wide limits depending upon the amount of dithioglycidol used and the reaction conditions such as temperature, time and presence or absence of catalyst.

The above description and examples are intended to be illustrative only. Any modification thereof or variation therefrom which conforms to the spirit of the invention is intended to be included within the scope of the claims.

What is claimed is:

1. Process which comprises bringing monomeric dithioglycidol in contact with a polymeric material until at least a portion of the dithioglycidol sulfur has become bound to the polymeric material and removing unbound dithioglycidol.

2. Process which comprises bringing monomeric dithioglycidol in contact with an organic polymeric material until at least a portion of the dithioglycidol sulfur has become bound to the polymeric material and removing unbound dithioglycidol.

3. Process which comprises bringing monomeric dithioglycidol in contact with a hydroxylated organic polymeric material until at least a portion of the dithioglycidol sulfur has become bound to the polymeric material and removing unbound dithioglycidol.

4. Process which comprises bringing monomeric dithioglycidol in contact with an organic polymeric material in the presence of a catalyst until at least a portion of the dithioglycidol becomes bound to the polymeric material and removing the unbound dithioglycidol.

5. Process which comprises bringing monomeric dithioglycidol in contact with a hydroxylated organic polymeric material in the presence of a catalyst until at least a portion of the dithioglycidol becomes bound to the polymeric material and removing the unbound dithioglycidol.

6. Process which comprises bringing monomeric dithioglycidol in contact with a cellulosic material in the presence of a catalyst until at least a portion of the dithioglycidol becomes bound to the cellulosic material and removing the unbound dithioglycidol.

7. Process of claim 1 wherein dithioglycidol is brought into contact with the polymeric material at 0–150° C.

8. A novel sulfur containing polymeric product of the contact of a polymeric material with monomeric dithioglycidol.

9. A novel sulfur containing polymeric product of the contact of an organic polymeric material with monomeric dithioglycidol.

10. A novel sulfur containing polymeric product of the contact of a hydroxylated organic polymeric material with monomeric dithioglycidol.

11. A novel sulfur containing cellulosic product of the contact of a cellulosic material with monomeric dithioglycidol.

12. Process of claim 2 wherein dithioglycidol is brought into contact with the polymeric material at 0–150° C.

13. Process of claim 3 wherein dithioglycidol is brought into contact with the polymeric material at 0–150° C.

14. Process of claim 4 wherein dithioglycidol is brought into contact with the polymeric material at 0–150° C.

15. Process of claim 5 wherein dithioglycidol is brought into contact with the polymeric material at 0–150° C.

16. Process of claim 6 wherein dithioglycidol is brought into contact with the polymeric material at 0–150° C.

WILBUR ARTHUR LAZIER.
FRANK KERR SIGNAIGO.